United States Patent
Kaneda et al.

(10) Patent No.: US 9,036,917 B2
(45) Date of Patent: May 19, 2015

(54) IMAGE RECOGNITION BASED ON PATTERNS OF LOCAL REGIONS

(71) Applicant: Canon Kabushiki Kaisha, Tokyo (JP)

(72) Inventors: Yuji Kaneda, Kawasaki (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/683,409

(22) Filed: Nov. 21, 2012

(65) Prior Publication Data

US 2013/0142426 A1 Jun. 6, 2013

(30) Foreign Application Priority Data

Dec. 1, 2011 (JP) ................. 2011-264123

(51) Int. Cl.
*G06K 9/48* (2006.01)
*G06K 9/00* (2006.01)
*G06K 9/46* (2006.01)

(52) U.S. Cl.
CPC .......... *G06K 9/4642* (2013.01); *G06K 9/00281* (2013.01); *G06K 9/00308* (2013.01)

(58) Field of Classification Search
None
See application file for complete search history.

(56) References Cited

U.S. PATENT DOCUMENTS

| | | | |
|---|---|---|---|
| 7,699,423 B2 | 4/2010 | Suwa et al. | |
| 7,881,524 B2 | 2/2011 | Matsugu et al. | |
| 8,130,281 B2 | 3/2012 | Kaneda et al. | |
| 8,275,175 B2 * | 9/2012 | Baltatu et al. | 382/118 |
| 8,295,606 B2 * | 10/2012 | Li et al. | 382/195 |
| 8,331,655 B2 | 12/2012 | Sato et al. | |
| 8,351,662 B2 * | 1/2013 | Wang | 382/118 |
| 8,582,836 B2 * | 11/2013 | Niskanen et al. | 382/118 |
| 8,805,018 B2 * | 8/2014 | Li et al. | 382/103 |
| 8,831,293 B2 * | 9/2014 | Wolf et al. | 382/118 |
| 2006/0115157 A1 | 6/2006 | Mori et al. | |
| 2007/0112699 A1 * | 5/2007 | Zhao et al. | 706/14 |
| 2007/0172099 A1 * | 7/2007 | Park et al. | 382/118 |
| 2008/0166026 A1 * | 7/2008 | Huang et al. | 382/118 |
| 2009/0074259 A1 * | 3/2009 | Baltatu et al. | 382/118 |
| 2009/0089235 A1 | 4/2009 | Torii et al. | |
| 2009/0220156 A1 * | 9/2009 | Ito et al. | 382/201 |
| 2009/0252413 A1 * | 10/2009 | Hua et al. | 382/170 |
| 2010/0232705 A1 * | 9/2010 | Li et al. | 382/195 |

(Continued)

FOREIGN PATENT DOCUMENTS

WO WO 2011079458 A1 * 7/2011

OTHER PUBLICATIONS

"Facial Expression Recognition by Automatic Facial Parts Position Detection with Boosted-LBP," Yi Ji et al, 2009 Fifth International Conference on Signal Image Technology and Internet Based Systems, pp. 28-35.*

(Continued)

*Primary Examiner* — Wenpeng Chen
(74) *Attorney, Agent, or Firm* — Fitzpatrick, Cella, Harper & Scinto

(57) ABSTRACT

An image is obtained. At least one local region is set in the image. Feature patterns are extracted from the local region, and, out of a plurality of bins corresponding to a plurality of patterns which can form the feature patterns, bins that have been determined in accordance with a type of the local region are set as histogram bins used in generating a histogram. A histogram is generated corresponding to the extracted feature patterns using the set histogram bins, and image recognition is performed using the generated histogram.

8 Claims, 18 Drawing Sheets

(56) References Cited

U.S. PATENT DOCUMENTS

| | | | |
|---|---|---|---|
| 2010/0329517 A1* | 12/2010 | Zhang et al. | 382/118 |
| 2011/0150280 A1* | 6/2011 | Tsuji | 382/103 |
| 2011/0293189 A1* | 12/2011 | Sun et al. | 382/195 |
| 2012/0033853 A1 | 2/2012 | Kaneda et al. | |
| 2012/0063639 A1 | 3/2012 | Yano | |
| 2012/0070041 A1* | 3/2012 | Wang | 382/118 |
| 2012/0092495 A1 | 4/2012 | Yano | |
| 2012/0148159 A1 | 6/2012 | Kaneda et al. | |
| 2012/0213419 A1* | 8/2012 | Kim et al. | 382/118 |
| 2012/0269405 A1 | 10/2012 | Kaneda et al. | |
| 2012/0288148 A1 | 11/2012 | Suzuki et al. | |
| 2012/0288152 A1 | 11/2012 | Yano | |
| 2012/0321140 A1* | 12/2012 | Xiong et al. | 382/108 |
| 2013/0015946 A1* | 1/2013 | Lau et al. | 340/5.2 |

OTHER PUBLICATIONS

C. Shan, et al., "Learning Discriminative LBP-Histogram Bins for Facial Expression Recognition" in Proc. British Machine Vision Conference, 2008.

P. Viola, et al., "Rapid Object Detection using a Boosted Cascade of Simple Features", in Proc. of CVPR. vol. 1, Dec. 2001.

T.F. Cootes, et al., "Active Appearance Models", IEEEE Transactions on Pattern Analysis and Machine Intelligence, vol. 23, No. 6, Jun. 2001.

S. Liao, et al., "Facial Expression Recognition Using Advanced Local Binary Patterns, Tsallis Entropies and Global Appearance Features", Proc. of the IEEE International Conference on Image Processing (ICIP), pp. 665-668, 2006.

N. Dalai, et al., "Histograms of Oriented Gradients for Human Detection", Proc. of the IEEE, Conference on Computer Visions and Pattern Recognition, 2005.

P. Ekman, et al., "Facial Action Coding System (FACS): Manual", Palo Alto Consulting Psychologists Press, 1978.

V. Vapnik, "Statistical Learning Theory", John Wiley & Sons, 1998.

U.S. Appl. No. 13/604,362, filed Sep. 4, 2012; Applicants: Naotsugu Sagawa, et al.

U.S. Appl. No. 13/686,429, filed Nov. 27, 2012; Applicants: Atsuo Nomoto, et al.

* cited by examiner

FIG. 8

| RECOGNITION TARGET | REGION | BIN NUMBER AND LBP |
|---|---|---|
| SMILE | MOUTH | 1 : 11100000<br>2 : 00111110<br>3 : 10001111<br>2 : 00011100<br>3 : 00000111 |
| | EYES | 1 : 11100000<br>2 : 00001110<br>3 : 11100011<br>4 : 11111000 |
| | CHEEKS | 1 : 00111110<br>2 : 10001111<br>3 : 11000001<br>4 : 01110000 |

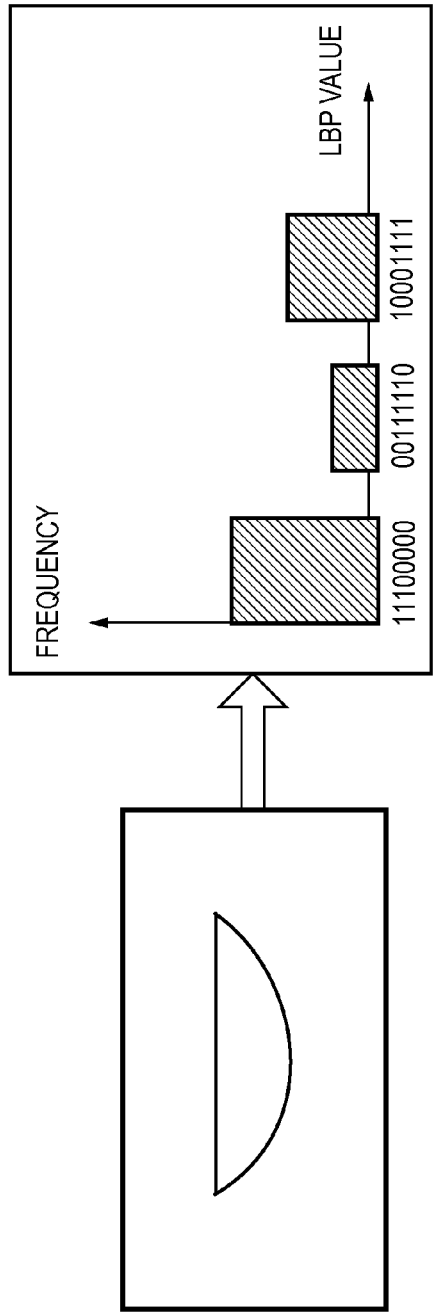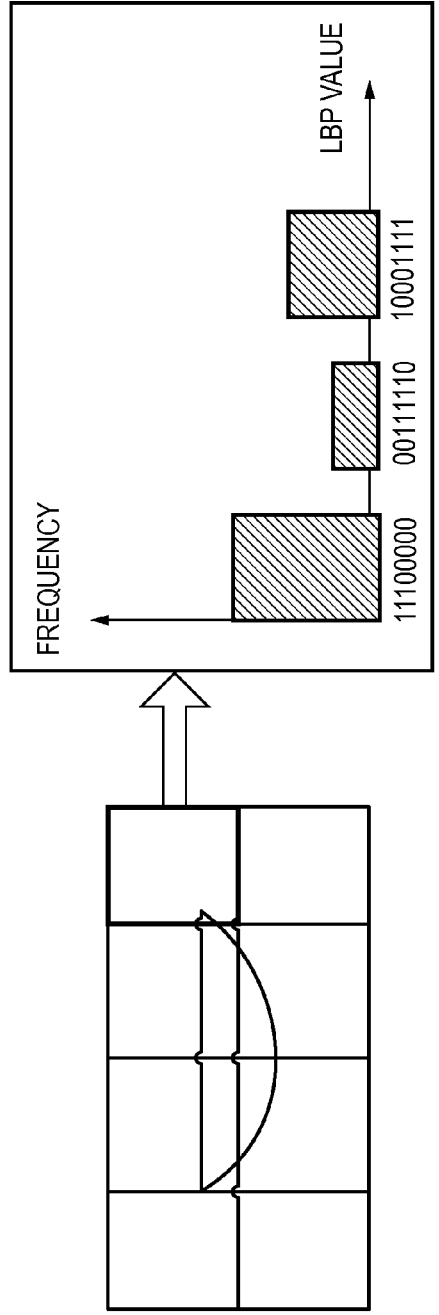

F I G. 15
| - | - | - |
|---|---|---|
| 1 |   | 0 |
| 1 | 1 | 0 |
| - | - | - |
|---|---|---|
| 0 |   | 0 |
| 1 | 1 | 1 |
| - | - | - |
|---|---|---|
| 0 |   | 1 |
| 0 | 1 | 1 |
F I G. 16
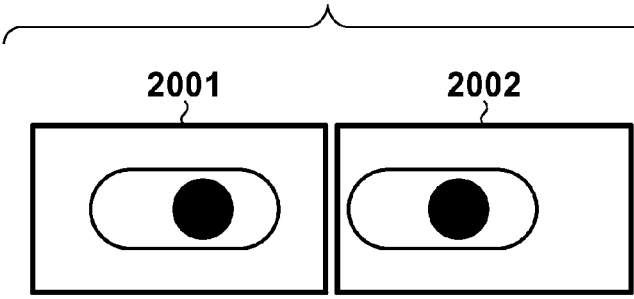
F I G. 17
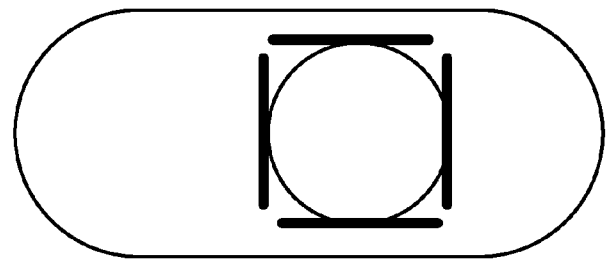

F I G. 20

| RECOGNITION TARGET | REGION | BIN NUMBER AND LBP |
|---|---|---|
| AGE AND SEX | OUTER CORNERS OF EYES | 1 : 11100000<br>2 : 00001110 |
| | LOWER EYELIDS | 1 : 11100000<br>2 : 00001110 |
| | CHEEKS | 1 : 00111110<br>2 : 10001111<br>3 : 11000001<br>4 : 01110000 |
| | OUTLINE | 1 : 00111000<br>2 : 10000011<br>3 : 00111100<br>4 : 10000111 |

F I G. 23
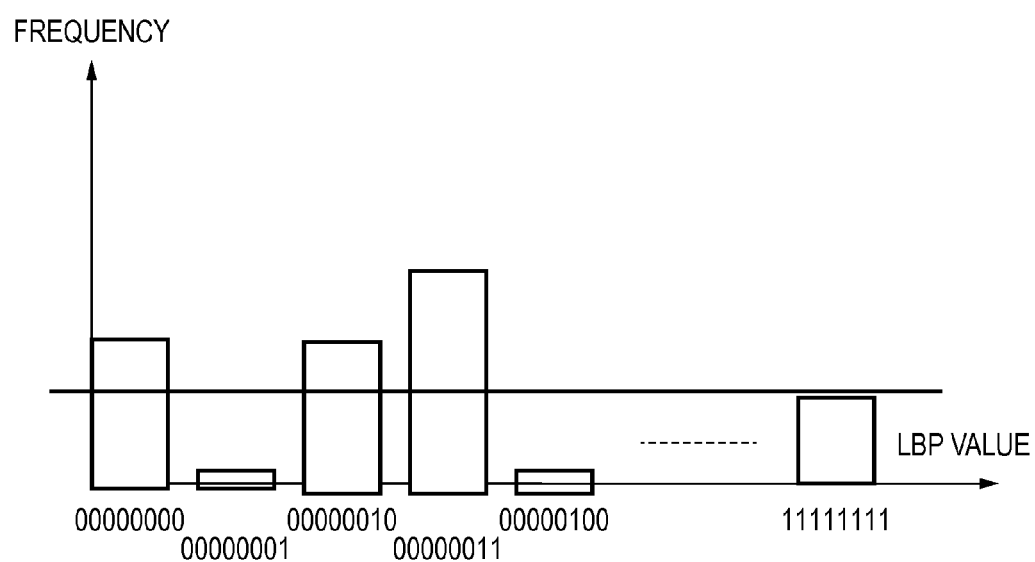
F I G. 24
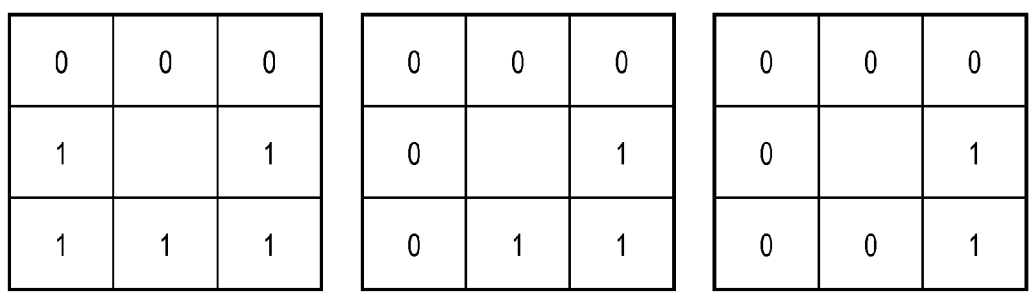

IMAGE RECOGNITION BASED ON PATTERNS OF LOCAL REGIONS

BACKGROUND OF THE INVENTION

1. Field of the Invention

The present invention relates to an image recognition apparatus, a control method for an image recognition apparatus, and a storage medium.

2. Description of the Related Art

Conventionally, there is a known technique to extract a face region from an image including a human face and recognize a facial expression by analyzing the extracted face region. Application of this technique to an imaging apparatus allows recording a face image when a person captured by the imaging apparatus smiles, and recording a face image when the person's line of sight is directed toward a camera.

A technique to recognize a facial expression using LBP histograms generated from local binary patterns (LBP) extracted from a luminance image is proposed in C. Shan and T. Gritti, "Learning Discriminative LBP-Histogram Bins for Facial Expression Recognition", Proc. British Machine Vision. Conference, 2008. The technique proposed in C. Shan and T. Gritti, "Learning Discriminative LBP-Histogram Bins for Facial Expression Recognition", Proc. British Machine Vision. Conference, 2008, is intended to improve robustness by absorbing misalignment of an object in an image with the use of histogram features.

However, in general, histogram features have many dimensions. This is problematic because the more dimensions of features there are, the larger the processing load on a discriminator. In the case where LBP histograms or luminance gradient histograms are used as features, the larger the number of histogram bins, the more dimensions of generated features there are, and the larger the processing load on a discriminator. Furthermore, bins that are easily affected by noise may cause false recognition.

SUMMARY OF THE INVENTION

In view of the above problems, the present invention provides a technique to improve the accuracy and speed of image recognition processing.

According to one aspect of the present invention, there is provided an image recognition apparatus comprising: an image obtainment unit configured to obtain an image; a region setting unit configured to set at least one local region in the image; a feature extraction unit configured to extract feature patterns from the local region; a setting unit configured to set, out of a plurality of bins corresponding to a plurality of patterns which can form the feature patterns, bins that have been predetermined in accordance with a type of the local region as histogram bins used in generating a histogram; a generation unit configured to generate a histogram corresponding to the extracted feature patterns using the set histogram bins; and a recognition unit configured to perform image recognition using the generated histogram.

According to one aspect of the present invention, there is provided a control method for an image recognition apparatus, comprising the steps of: obtaining an image; setting at least one local region in the image; extracting feature patterns from the local region; setting, out of a plurality of bins corresponding to a plurality of patterns which can form the feature patterns, bins that have been predetermined in accordance with a type of the local region as histogram bins used in generating a histogram; generating a histogram corresponding to the extracted feature patterns using the set histogram bins; and performing image recognition using the generated histogram.

Further features of the present invention will be apparent from the following description of exemplary embodiments with reference to the attached drawings.

BRIEF DESCRIPTION OF THE DRAWINGS

FIG. 8 shows bin numbers and LBP set in accordance with recognition targets and feature extraction regions.

FIGS. 9A and 9B show generation of histograms for detailed divided regions of the mouth that have been set for recognizing a facial expression of a smile.

FIG. 15 shows bin numbers and directional ranges set in accordance with recognition targets and feature extraction regions.

FIG. 16 shows feature extraction regions of eyes necessary for recognizing a line of sight.

FIG. 17 shows edges of an outline of a pupil and inclination directions thereof, which are important in recognizing the direction of the eyes.

FIG. 20 shows bin numbers and LBP set in accordance with feature extraction regions used in estimating the age and sex.

FIG. 23 shows statistics of a certain region in a face and a threshold for determining whether or not to use LBP.

FIG. 24 shows LBP in which three most significant bits have the same values.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

First Embodiment describes an example in which the recognition target is a facial expression attribute of a human face, automatic imaging is performed when a certain facial expression is recognized, and images are recorded in, for example, a memory.

Figure 1:
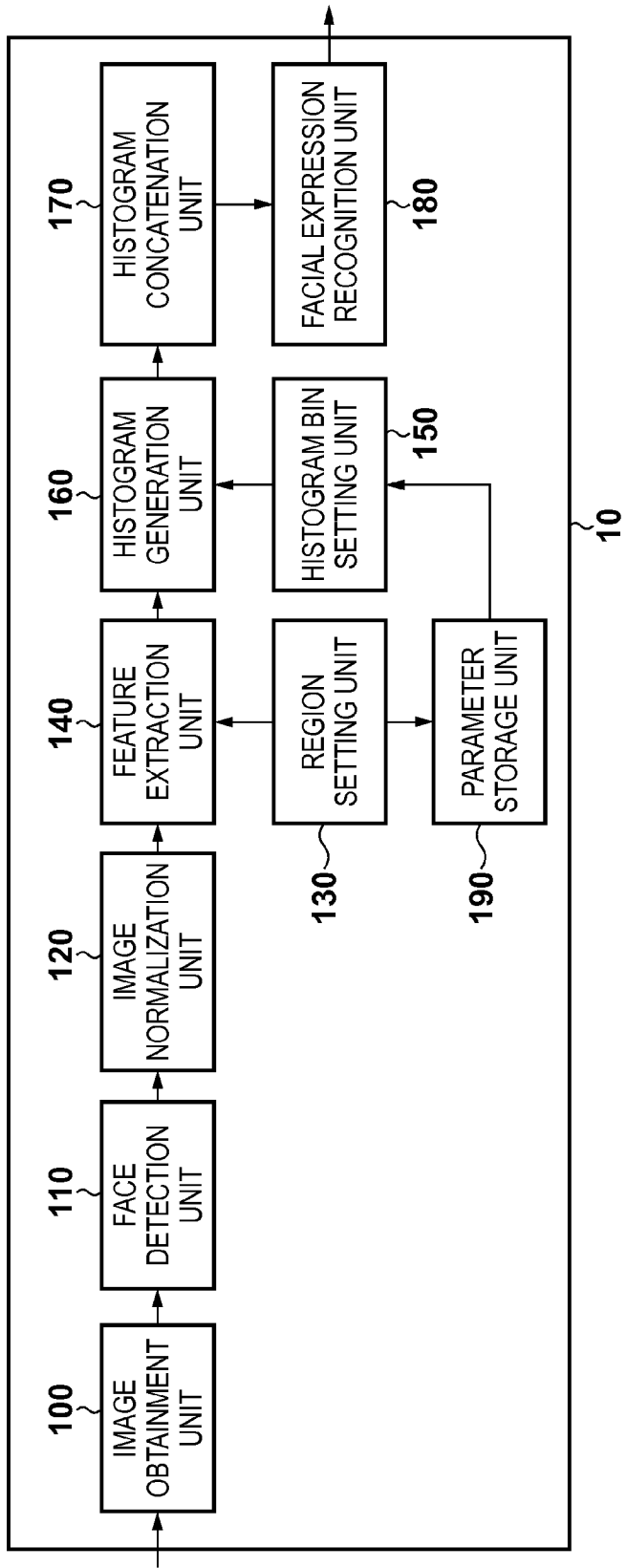
FIG. 1 shows an overall configuration of an image recognition apparatus according to First Embodiment.

First, a description is given of an overall configuration of an image recognition apparatus 10 according to First Embodiment with reference to FIG. 1. The image recognition apparatus 10 includes an image obtainment unit 100, a face detection unit 110, an image normalization unit 120, a region setting unit 130, a feature extraction unit 140, a histogram bin setting unit 150, a histogram generation unit 160, a histogram concatenation unit 170, a facial expression recognition unit 180, and a parameter storage unit 190. Operations of these processing units are controlled by CPU, which is not shown in the figures.

The image obtainment unit 100 obtains a digital image using a light focusing element (e.g. a lens), an image sensor (e.g. CMOS and CCD) that converts light into electric signals, and an AD converter that converts analog signals to digital signals. Furthermore, the image obtainment unit 100 can convert the digital image into a low-resolution image by executing, for example, thinning processing. For example, the image obtainment unit 100 can obtain a VGA image (640×480 pixels) and a QVGA image (320×240 pixels) as a result of conversion.

The face detection unit 110 executes a face detection process on the image obtained by the image obtainment unit 100. The present embodiment uses the technique of the face detection process disclosed in P. Viola and M. Jones, "Rapid Object Detection Using a Boosted Cascade of Simple Features", in Proc. of CVPR, vol. 1, December, 2001. The image normalization unit 120 generates a normalized image by cutting out a face region and performing the affine transformation so as to place the detected face in a predetermined size and an upright position.

The region setting unit 130 sets a plurality of local regions with respect to the normalized image generated by the image normalization unit 120 using a plurality of feature points of the detected face. In order to set local regions with higher accuracy, local regions may be set based on more detailed feature points extracted using a technique described in Timothy F. Cootes, Gareth J. Edwards, and Christopher J. Taylor, "Active Appearance Models", IEEE Transactions on Pattern Analysis and Machine Intelligence, Vol. 23, No. 6, June 2001.

The feature extraction unit 140 extracts local binary pattern (LBP) features from each of the plurality of regions set by the region setting unit 130 as described in C. Shan and T. Gritti, "Learning Discriminative LBP-Histogram Bins for Facial Expression Recognition", Proc. British Machine Vision. Conference, 2008.

Out of a plurality of bins corresponding to a plurality of patterns forming the LBP features (feature patterns), the histogram bin setting unit 150 sets bins that have been predetermined in accordance with a type of each local region as bins used in generating a histogram. Specifics of the setting process executed by the histogram bin setting unit 150 will be described later. The histogram generation unit 160 generates a histogram with respect to each local region set by the region setting unit 130 using the histogram bins set by the histogram bin setting unit 150 and the LBP images extracted by the feature extraction unit 140. The histogram concatenation unit 170 generates one feature vector by concatenating all histograms generated by the histogram generation unit 160.

The facial expression recognition unit 180 performs facial expression recognition using the feature vector generated by the histogram concatenation unit 170.

The parameter storage unit 190 stores, as parameters, pairs of bins representing LBP features that have been predetermined by obtaining statistics and should be used in accordance with regions in a face, and bin numbers. The histogram bin setting unit 150 sets bins necessary for generating histograms based on information stored in the parameter storage unit 190.

Figure 2:
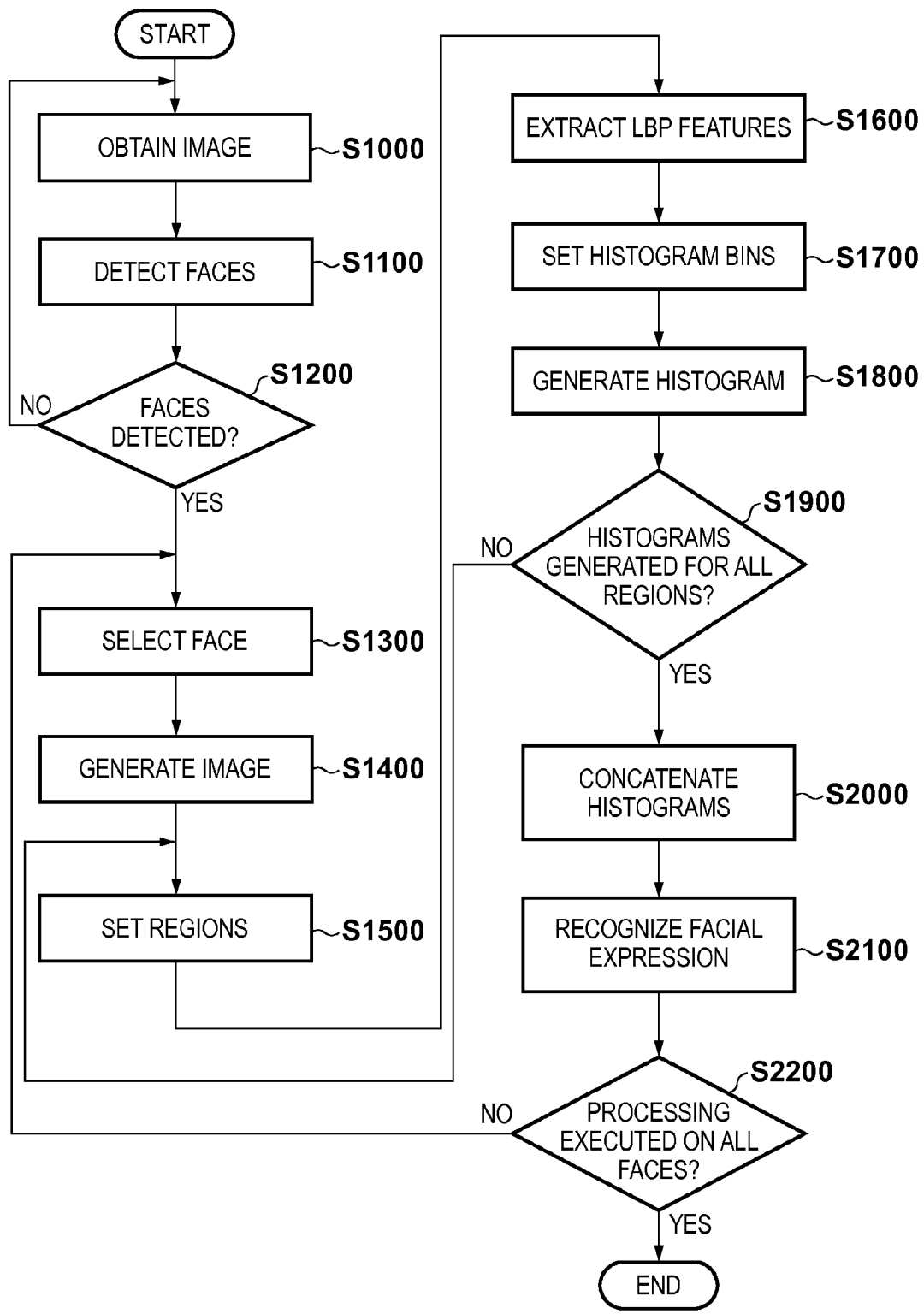
FIG. 2 is a flowchart showing a procedure of processing executed by the image recognition apparatus according to First Embodiment.

The following describes a procedure of processing executed by the image recognition apparatus 10 according to the present embodiment with reference to a flowchart of FIG. 2.

In step S1000, the image obtainment unit 100 obtains image data. In step S1100, the face detection unit 110 executes a face detection process on the image obtained in step S1000. For example, through the face detection process of step S1100, coordinates shown on the left side of FIG. 3 can be obtained. More specifically, central coordinates (x, y) 1110 and 1111 of right and left eyes, central coordinates (x, y) 1112 of a face, and central coordinates (x, y) 1113 of a mouth can be obtained.

In step S1200, the face detection unit 110 determines whether or not faces have been detected. When the face detection unit 110 determines that faces have been detected (the YES branch of S1200), the processing moves to S1300. On the other hand, when the face detection unit 110 determines that faces have not been detected (the NO branch of S1200), the processing returns to S1000. In step S1300, the face detection unit 110 selects one of the plurality of detected faces.

Figure 3:
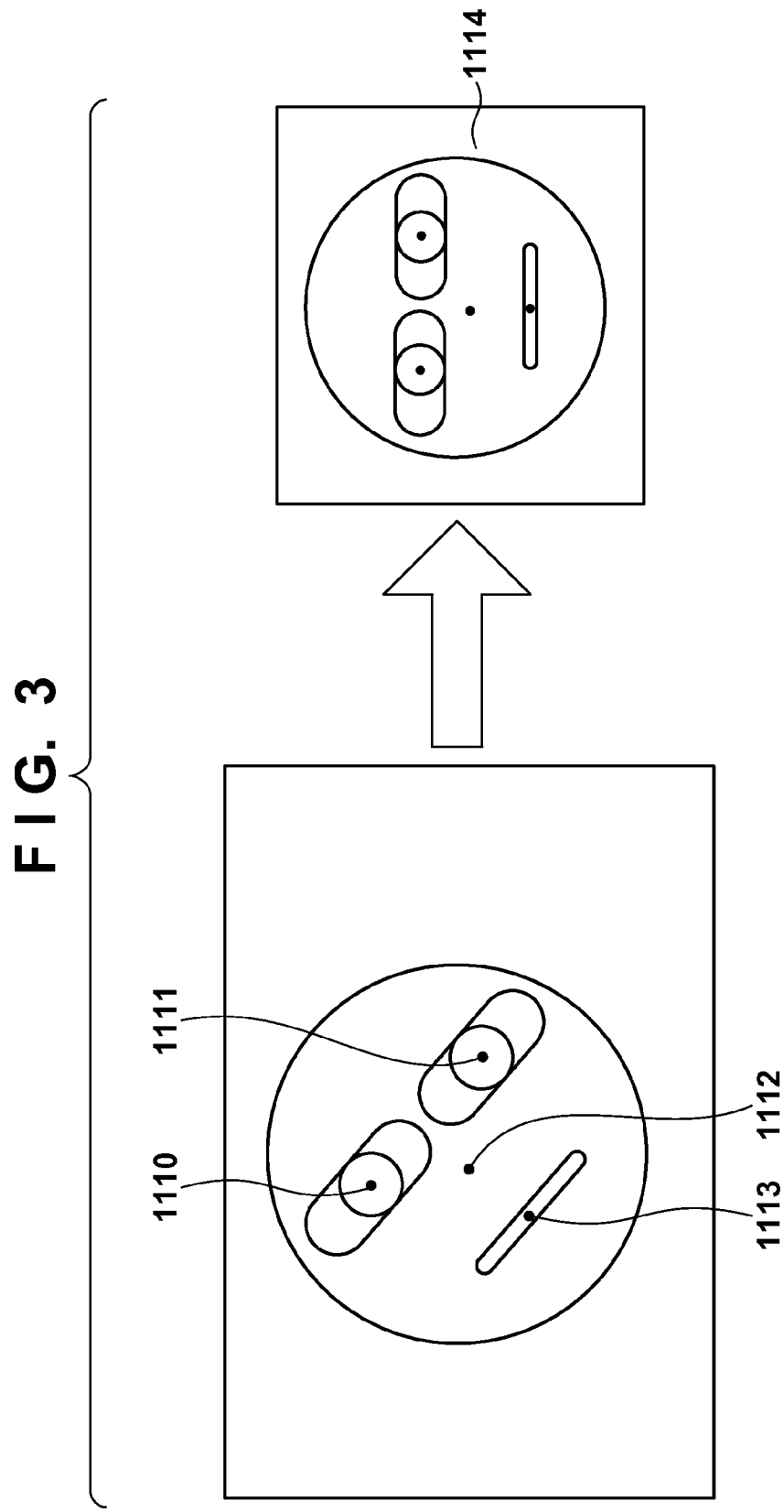
FIG. 3 shows examples of barycentric positions of the right and left eyes, face and mouth detected from an image, and an example of a normalized image.

In step S1400, the image normalization unit 120 generates a normalized image 1114 by cutting out a face region and performing the affine transformation so as to place the face in a predetermined size and an upright position, with the use of the central coordinates (x, y) 1112 of the face and the central coordinates (x, y) 1110 and 1111 of the right and left eyes shown in FIG. 3, which were obtained in step S1100. For example, the distance between the central coordinates (x, y) 1110 and 1111 of the right and left eyes and the inclination thereof may be calculated and used as a scaling amount and a rotation amount, respectively, in the affine transformation.

In step S1500, the region setting unit 130 sets a plurality of local regions with respect to the normalized image 1114 generated in step S1400 using the central coordinates (x, y) 1112 of the face, the central coordinates (x, y) 1110 and 1111 of the right and left eyes, and the central coordinates (x, y) 1113 of the mouth shown in FIG. 3, which were detected in step S1100.

Figure 4:
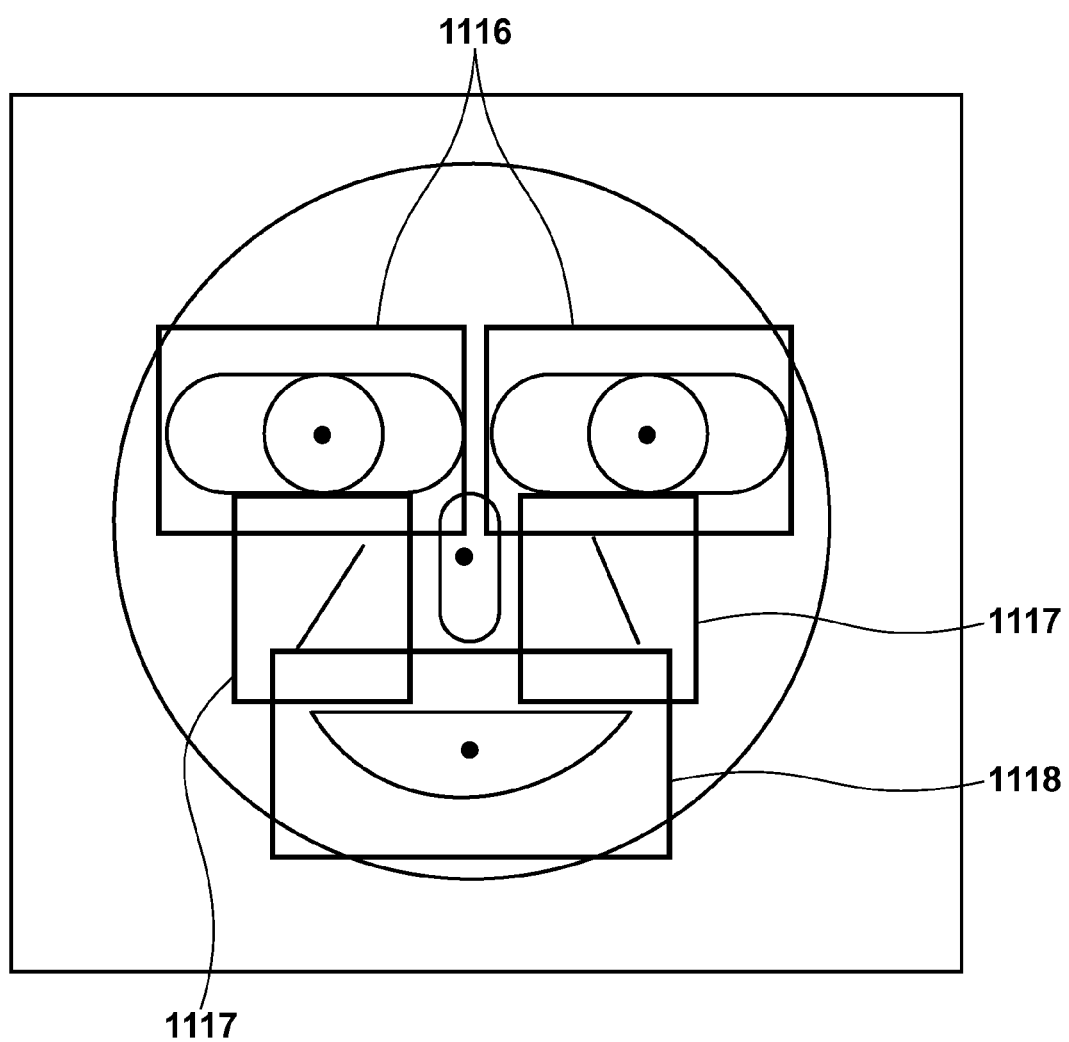
FIG. 4 shows a feature extraction region of a mouth necessary for recognizing a facial expression of a smile.

For example, in order to detect a smile, which is one example of facial expressions, it is extremely important to capture shapes of the eyes and the mouth as well as wrinkles on the cheeks. Therefore, as shown in FIG. 4, a plurality of local regions 1116, 1117 and 1118 are set using the central coordinates (x, y) 1112 of the face, the central coordinates (x, y) 1110 and 1111 of the right and left eyes, and the central coordinates (x, y) 1113 of the mouth. The local regions 1116 are related to the eyes. The local regions 1117 are related to the cheeks. The local region 1118 is related to the mouth. In order to detect various facial expressions other than a smile, local regions corresponding to movements within the face may be set using a technique disclosed in P. Ekman and W. V. Friesen, "Facial Action Coding System (FACS): Manual", Consulting Psychologists Press, Palo Alto, 1978.

Figure 5A:
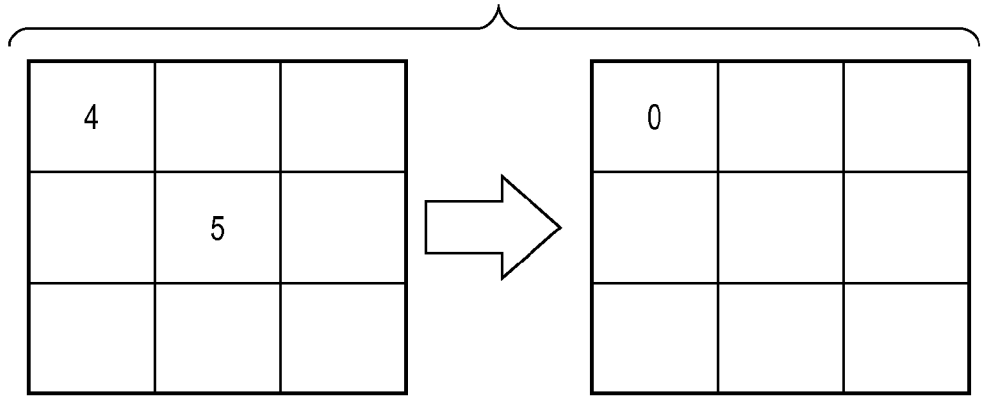
FIGS. 5A and 5B show examples of LBP coding.
Figure 5B:
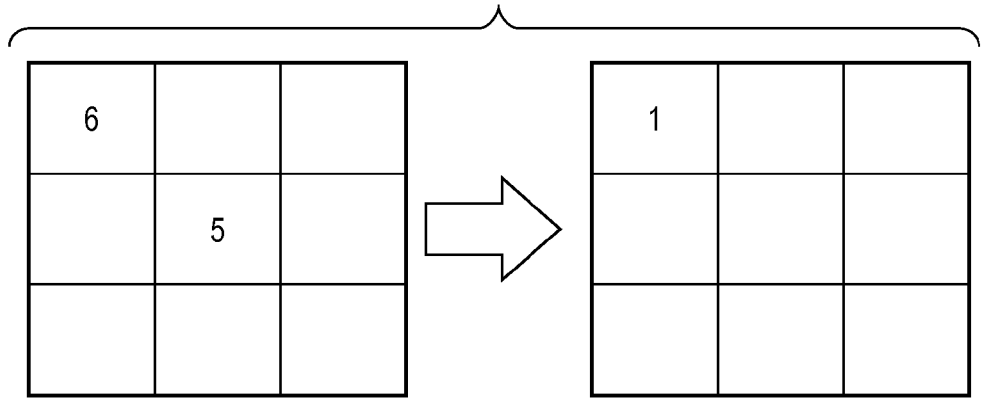
Figure 6:
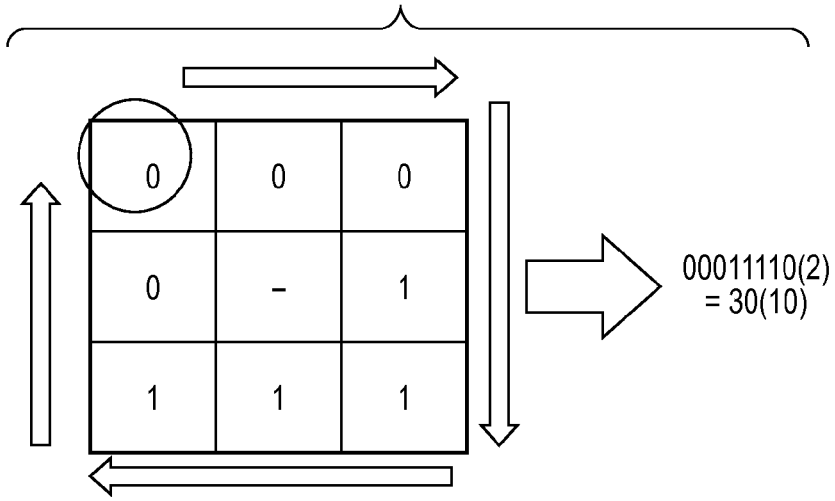
FIG. 6 shows a binary value and a decimal value obtained through LBP coding.

In step S1600, the feature extraction unit 140 extracts local binary pattern (LBP) features from each of the local regions 1116 to 1118 set in step S1500 as described in C. Shan and T. Gritti, "Learning Discriminative LBP-Histogram Bins for Facial Expression Recognition", Proc. British Machine Vision. Conference, 2008. Note that a basic method for extracting LBP features is to compare the value of a target pixel with the values of eight pixels adjacent to the target pixel. There are various other methods for extracting LBP features, such as a method using values of pixels that are distant from a target pixel by a predetermined number of pixels as described in S. Liao, W. Fan, A. Chung, and D. Yeung, "Facial Expression Recognition Using Advanced Local Binary Patterns", Tsallis Entropies and Global Appearance Features, Proc. of the IEEE International Conference on Image Processing (ICIP), pages 665-668, 2006. Any method may be used. The present embodiment uses the basic method whereby the value of a central pixel is compared with the values of eight pixels adjacent to the central pixel. First, a binary coding process is executed by comparing the value of a central pixel with the values of eight pixels adjacently surrounding the central pixel. More specifically, as shown in FIGS. 5A and 5B, each of the eight pixels adjacently surrounding the central pixel is coded to 1 when its value is greater than or equal to the value of the central pixel, and 0 when its value is smaller than the value of the central pixel. In FIG. 5A, the value of the upper-left pixel is 4 and the value of the central pixel is 5, and therefore the upper-left pixel is coded to 0 through the binary coding process. In FIG. 5B, the value of the upper-left pixel is 6 and the value of the central pixel is 5, and therefore the upper-left pixel is coded to 1 through the binary coding process. This operation is performed on each of the eight pixels surrounding the central pixel. Then, as shown in FIG. 6, an 8-bit binary value is generated by concatenating the values of the eight pixels adjacently surrounding the central pixel, with a predetermined pixel value serving as the most significant bit. Note that any pixel value may be set as the most significant bit. In the example of FIG. 6, the pixel located diagonally to the upper-left of the central pixel serves as the most significant bit, and the pixel values are concatenated along a clockwise direction. By executing this process, LBP features can be extracted. In the example of FIG. 6, the binary value is 00011110, and the decimal value is 30.

In step S1700, out of a plurality of bins corresponding to a plurality of patterns forming the LBP features, the histogram bin setting unit 150 sets bins that have been predetermined in accordance with a type of the local region as bins used in generating a histogram. Below is a description of a method for setting the bins in step S1700.

In step S1600, 8-bit LBP features are extracted. Therefore, there are 256 LBP feature patterns, ranging from 0 to 255. That is to say, when all of the 8-bit LBP feature patterns are used for a histogram, 256 patterns of histogram bins are necessary.

Figure 7:
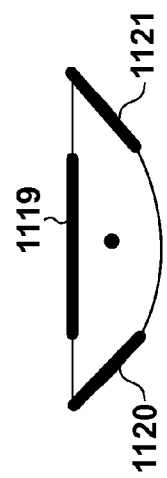
FIG. 7 shows LBP that is important in recognizing a facial expression of a smile.

However, as has been mentioned earlier, in order to detect a smile, it is extremely important to capture shapes of the eyes and the mouth as well as wrinkles on the cheeks. For example, in the local region 1118 of FIG. 4 that captures the shape of the mouth, a horizontal edge 1119 and diagonal edges 1120 and 1121 shown in FIG. 7 are important. Hence, in the local region 1118 that captures the shape of the mouth, a histogram is generated using only five LBP features shown in FIG. 7, instead of using all of the 8-bit LBP features. Similarly, in the case of wrinkles around the eyes and on the cheeks, a histogram is generated using only the LBP features that are important in detecting a smile. FIG. 8 is a table showing LBP features corresponding to regions in the face for which histograms are generated for the case where the recognition target is a smile. The LBP features 10001111 and 00000111 of the diagonal edge 1120 shown in FIG. 7 are both patterns representing a diagonal edge, and thus may be considered substantially as the same feature. For this reason, in the present embodiment, the LBP features 10001111 and 00000111 are added to the same bin. However, the present invention is not limited in this way. Alternatively, the LBP features 10001111 and 00000111 may be set as different bins.

By thus restricting the histogram bins in accordance with recognition targets and regions in the face for which histograms are generated, the number of histogram bins can be reduced. A reduction in the number of histogram bins makes it possible to reduce dimensions of a feature vector generated using histograms. This can alleviate the processing load at a stage subsequent to the histogram generation process.

Note that the LBP features, which are used in accordance with recognition targets and regions in the face for which histograms are generated, are determined by obtaining statistics in advance. For example, in order to recognize a smile, bins corresponding to feature patterns that have a higher frequency of appearance in a target region of many images of smiles collected in advance than a threshold are set. By thus setting bins that are effective in recognition processing in advance based on statistics, it is possible to avoid effects of bins that are easily affected by noise and thus trigger false recognition. This is effective in improving the accuracy.

The LBP feature patterns determined from statistics in the above manner are paired with bin numbers, and the pairs are stored as parameters in the parameter storage unit 190. In the actual image recognition processing, the histogram bins are set in the histogram bin setting process of step S1700 by reading the parameters stored in the parameter storage unit 190 in accordance with the recognition target and the region in the face for which a histogram is generated.

In order to further recognize a facial expression other than a smile, such as a facial expression of surprise, LBP features unique to a facial expression of surprise should be stored in advance in addition to the above-described LBP features unique to a smile. For example, in the case of a facial expression of surprise, the mouth opens in a vertical direction, and therefore LBP features representing vertical edges are stored.

In step S1800, the histogram generation unit 160 generates a histogram shown in FIG. 9A with respect to each local region set in step S1500 using the histogram bins set in step S1700 and the LBP images extracted in step S1600.

In order to capture subtle changes in a facial expression, it is possible to divide each local region set in step S1500 into a plurality of blocks and generate histograms with respect to smaller regions as shown in FIG. 9B. However, as the number of regions increases, the total number of histogram bins also increases in proportion. By reducing histogram bins using the method described in the present embodiment, the processing load at a subsequent stage can be alleviated while improving the accuracy.

LBP feature patterns that do not correspond to the set histogram bins may be directly discarded, or may be added to another bin that has been prepared in addition to the histogram bins set in step S1700.

In step S1900, the histogram generation unit 160 determines whether or not the histogram generation process has been executed on all of the local regions in the face set in step S1500. When the histogram generation unit 160 determines that histograms have been generated with respect to all of the regions in the face (the YES branch of S1900), the processing moves to S2000. On the other hand, when the histogram generation unit 160 determines that histograms have not been generated with respect to all of the regions in the face (the NO branch of S1900), the processing returns to step S1500 where a new region necessary for the recognition target is set.

In step S2000, the histogram concatenation unit 170 generates one feature vector by concatenating all the histograms generated in step S1800. Note that the histograms generated with respect to regions of the eyes, mouth, etc. may be concatenated after normalizing the histograms on a per-region basis, instead of simply being concatenated as-is. Alternatively, feature vectors generated from a plurality of frame images may be concatenated.

In step S2100, the facial expression recognition unit 180 performs facial expression recognition using the feature vector generated in step S2000. Here, a facial expression recognizer with a preliminary learning ability, such as a support vector machine (SVM) of V. Vapnik, "Statistical Learning Theory", John Wiley & Sons, 1998, is prepared. More specifically, in order to recognize a facial expression of a smile, a facial expression recognizer that has conducted a preliminary learning with the use of a group of feature vectors associated with a smile and other facial expressions is used. When a facial expression recognizer is configured using a technique described in V. Vapnik, "Statistical Learning Theory", John Wiley & Sons, 1998, the facial expression recognizer performs an inner product calculation. Accordingly, by reducing the number of dimensions of the feature vector generated in step S2000, the processing load on the facial expression recognizer can be alleviated. Furthermore, in the case where a dimension reduction process is executed on the feature vector generated in step S2000 through, for example, principal component analysis (PCA) at a stage preceding the process of step S2100, it is basically the inner product calculation, and therefore the processing load can be alleviated.

It is possible to recognize not only a smile but also one facial expression out of a plurality of facial expressions by preparing facial expression recognizers that recognize different facial expressions and arranging them in accordance with a tree structure. It is also possible to input the feature vector to a plurality of facial expression recognizers and recognize a facial expression corresponding to a facial expression recognizer with the largest output as a facial expression at that time. When a plurality of recognizers are configured in the above manner instead of just one recognizer, the processing load can be alleviated to a great extent.

In step S2200, the face detection unit 110 determines whether or not the processing has been executed on all the faces detected in step S1100. When the face detection unit 110 determines that the processing has been executed on all the faces (the YES branch of S2200), the processing ends. On the other hand, when the face detection unit 110 determines that the processing has not been executed on all the faces (the NO branch of S2200), the processing returns to S1300 where the face detection unit 110 selects a face on which the processing has not been executed yet. Then, the selected face is similarly subjected to subsequent processes.

This concludes the description of the method for reducing the number of bins of histograms generated from the LBP features in accordance with recognition targets and regions in the face for which histograms are generated. This method allows reducing dimensions of a feature vector generated using the histograms, and therefore alleviating the processing load at a stage subsequent to the histogram generation process.

Furthermore, by setting bins that are effective for recognition in advance based on statistics as described in the present embodiment, it is possible to not only alleviate the processing load but also avoid the effects of bins that are easily affected by noise and thus trigger false recognition. This is effective in improving the accuracy.

Although the LBP features are extracted in step S1600 in the present embodiment, it is possible to instead extract histograms in which the vertical axis and the horizontal axis represent the luminance gradient intensity and the luminance gradient direction, respectively, as described in Dalal and Triggs, "Histograms of Oriented Gradients for Human Detection", Proceedings of the IEEE Conference on Computer Vision and Pattern Recognition, 2005, or histograms generated from various features such as colors. Alternatively, it is possible to extract a combination of these histograms.

Furthermore, although the recognition target is a facial expression such as a smile in the present embodiment, the present invention is also applicable to estimation of attributes such as the direction of a line of sight of a face, age, sex and race, and to detection of a position of an object. The present invention is also applicable to detection of a human body from an image as described in Dalal and Triggs, "Histograms of Oriented Gradients for Human Detection", Proceedings of the IEEE Conference on Computer Vision and Pattern Recognition, 2005.

According to the present embodiment, a reduction in the number of histogram bins enables acceleration of the image recognition processing. In addition, the effects of bins that are easily affected by noise and thus trigger false recognition can be avoided. This is effective in improving the accuracy.

(Second Embodiment)

Unlike First Embodiment, Second Embodiment describes an example in which the recognition target is an attribute representing a line of sight, automatic imaging is performed when the line of sight is directed toward a camera, and images are stored in, for example, a memory.

Figure 10:
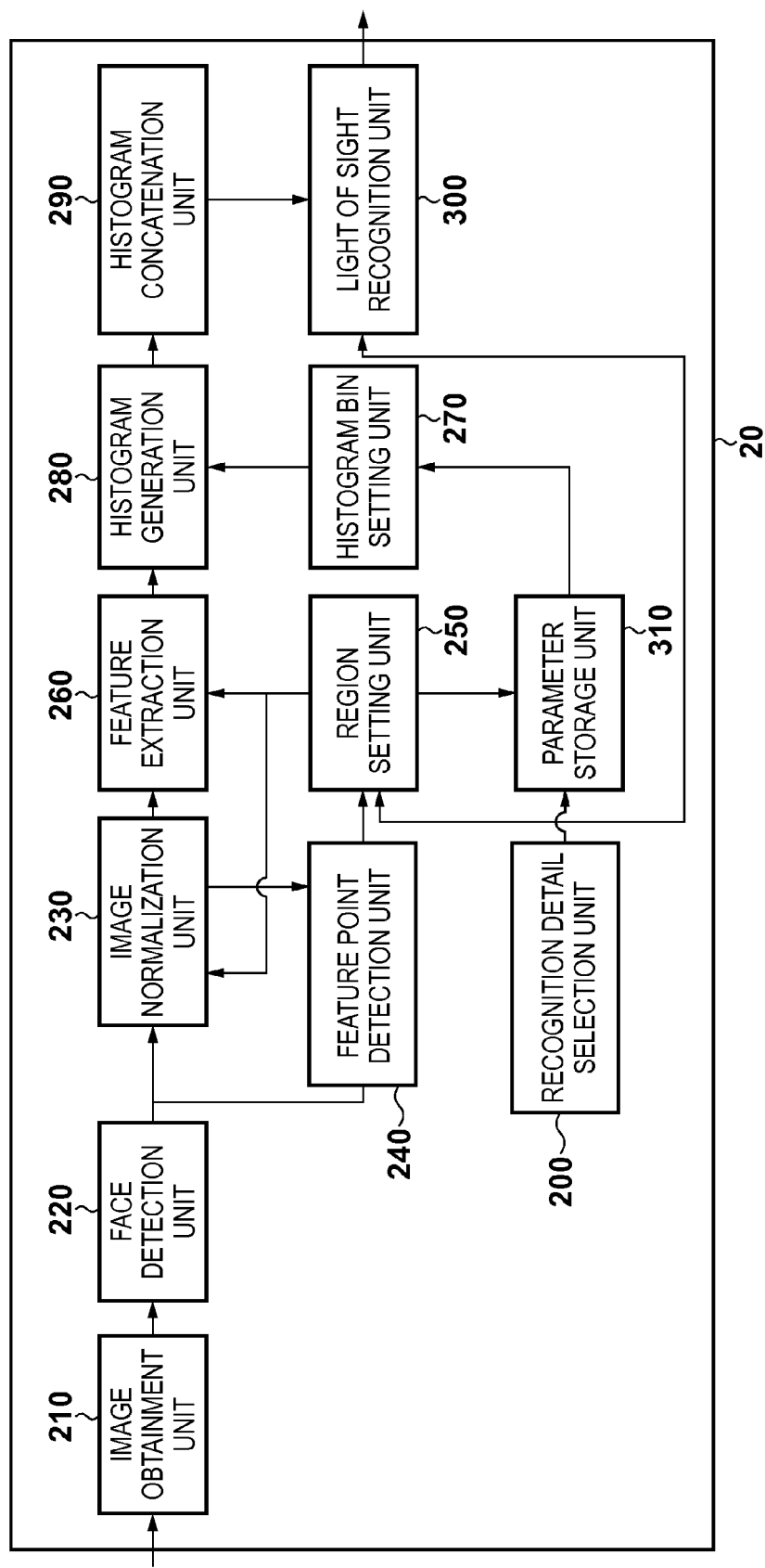
FIG. 10 shows an overall configuration of an image recognition apparatus according to Second Embodiment.

First, a description is given of an overall configuration of an image recognition apparatus 20 according to Second Embodiment with reference to FIG. 10. The image recognition apparatus 20 includes a recognition detail selection unit 200, an image obtainment unit 210, a face detection unit 220, an image normalization unit 230, a feature point detection unit 240, a region setting unit 250, a feature extraction unit 260, a histogram bin setting unit 270, a histogram generation unit 280, a histogram concatenation unit 290, a line of sight recognition unit 300, and a parameter storage unit 310. Operations of these processing units are controlled by CPU, which is not shown in the figures.

Upon accepting a selection of a type of recognition from a user, the recognition detail selection unit 200 sets a condition under which the automatic imaging is performed. As with the image obtainment unit 100 in First Embodiment, the image obtainment unit 210 obtains image data. As in First Embodiment, the face detection unit 220 executes a face detection process on the image obtained by the image obtainment unit 210. As in First Embodiment, the image normalization unit 230 generates a normalized image from the image detected by the face detection unit 220. The feature point detection unit 240 detects more detailed feature points, such as inner and outer corners of the eyes, using the normalized image generated by the image normalization unit 230.

The region setting unit 250 sets a feature extraction region necessary for recognizing a person's line of sight. As in First Embodiment, the feature extraction unit 260 extracts LBP features from the image including a region of the entire face set by the region setting unit 250. As in First Embodiment, the histogram bin setting unit 270 sets bins necessary for generating histograms. The histogram generation unit 280 generates histograms based on the LBP features extracted by the feature extraction unit 260 and the histogram bins set by the histogram bin setting unit 270. The histogram concatenation unit 290 generates a feature vector by concatenating histograms representing the direction of a human face and the direction of the eyes, which were generated by the histogram generation unit 280. The line of sight recognition unit 300 recognizes a line of sight through a binary determination process for determining whether or not a person's line of sight is directed toward a camera. The parameter storage unit 310 stores, in advance, LBP features necessary for recognizing a line of sight, such as LBP features corresponding to edges of a facial outline, for each local region.

Figure 11:
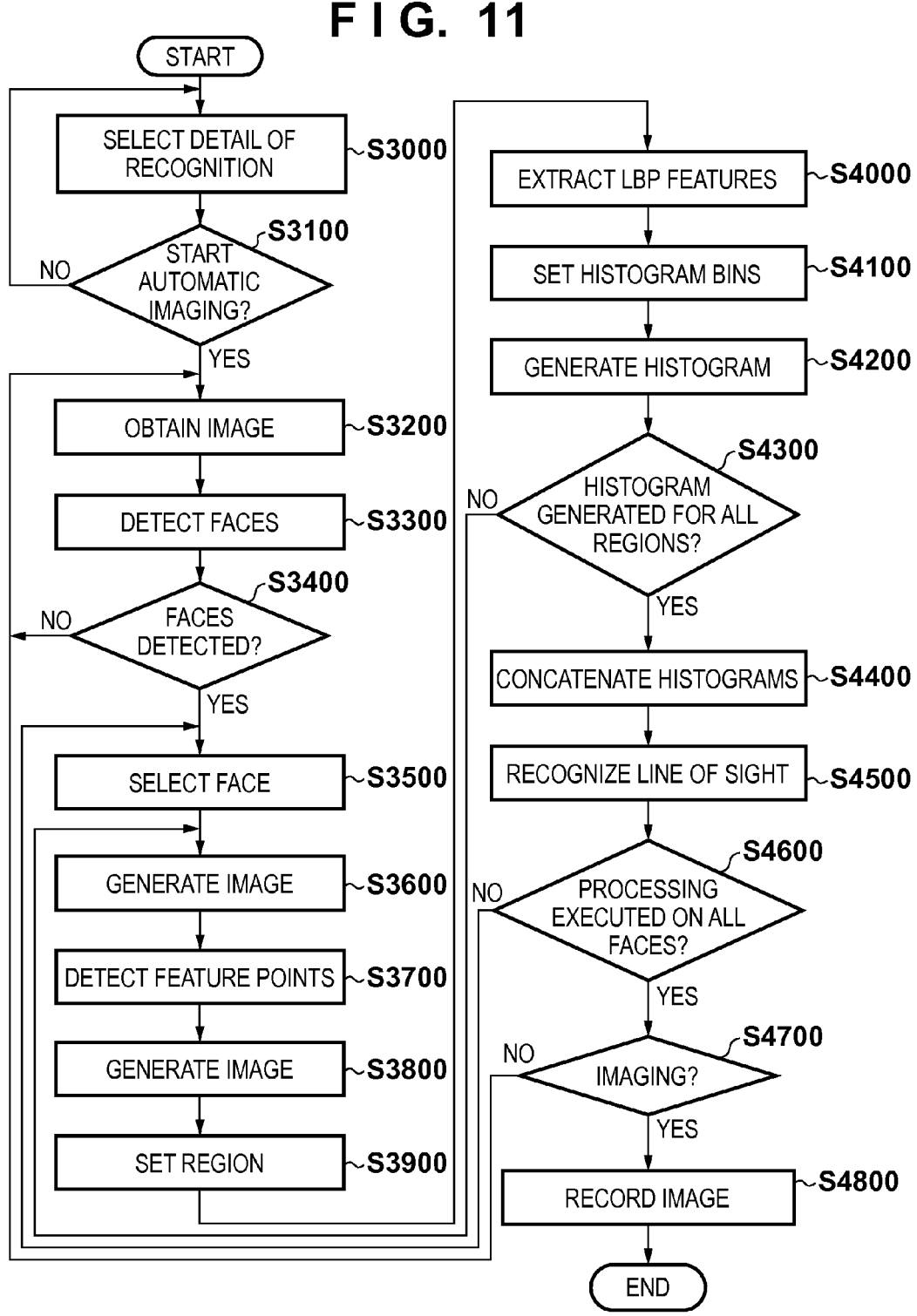
FIG. 11 is a flowchart showing a procedure of processing executed by the image recognition apparatus according to Second Embodiment.

The following describes a procedure of processing executed by the image recognition apparatus 20 according to the present embodiment with reference to a flowchart of FIG. 11.

In step S3000, upon accepting a selection of a recognition target, the recognition detail selection unit 200 sets a condition under which the automatic imaging is performed. In the present embodiment, either a smile or a line of sight can be selected. For example, in the case where recognition of a line of sight is selected, the recognition detail selection unit 200 sets the automatic imaging to be performed when a line of sight of a human face is directed toward a camera.

In step S3100, the image recognition apparatus 20 determines whether or not to start an automatic imaging mode. The automatic imaging mode is started when, for example, a shutter button is pressed halfway. When the image recognition apparatus 20 determines that the automatic imaging mode is to be started (the YES branch of S3100), the processing moves to S3200. On the other hand, when the image recognition apparatus 20 determines that the automatic imaging mode is not to be started (the NO branch of S3100), the processing returns to S3000.

Processes of steps S3200 to S3500 are similar to processes of steps S1000 to S1300 in First Embodiment, and therefore a description thereof is omitted.

Figure 12:
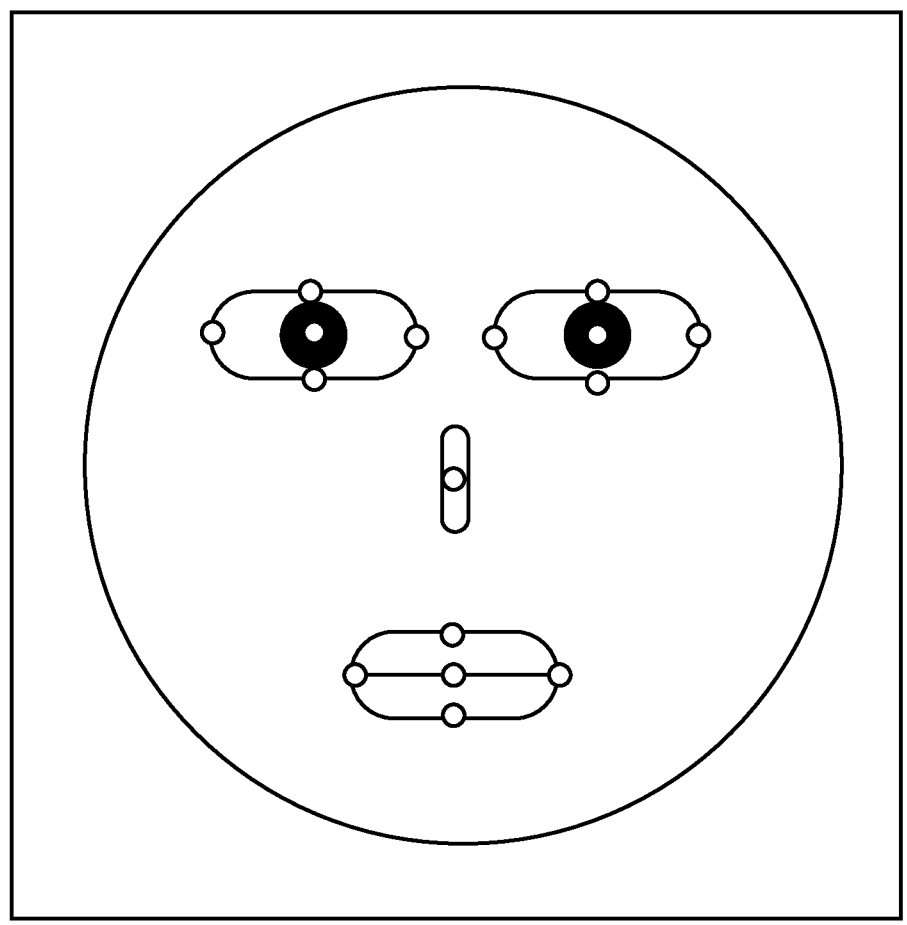
FIG. 12 shows an example of the result of more detailed detection of feature points.

In step S3600, the image normalization unit 230 generates a normalized image as in First Embodiment. Here, the image normalization unit 230 generates a normalized image to be used by the feature point detection unit 240. In step S3700, the feature point detection unit 240 detects more detailed feature points, such as inner and outer corners of the eyes, with the use of the normalized image generated in step S3600 as shown in FIG. 12. There are various methods for detecting feature points, including the method described in First Embodiment. Although any method may be used, the present embodiment uses a method whereby feature points are detected through template matching with the use of templates that have been prepared in advance for detecting different feature points.

In step S3800, the image normalization unit 230 generates a normalized image used for feature extraction by performing the affine transformation with the use of the feature points detected in step S3700, so as to place the face in a predetermined size.

Figure 13:
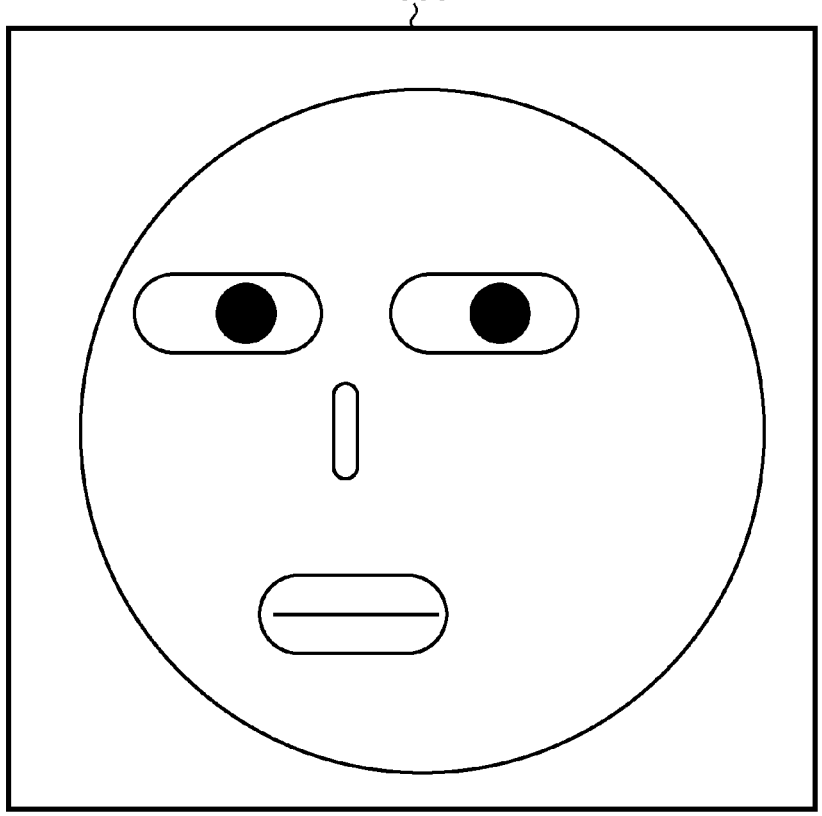
FIG. 13 shows a feature extraction region of a face necessary for recognizing a line of sight.

In the case of recognition of a person's line of sight, the point at which the person is looking is recognized comprehensively based on the direction of the face and the direction of the eyes. Therefore, in the present embodiment, features representing the direction of a human face and features representing the direction of the eyes are extracted. First, a normalized image 2000 shown in FIG. 13 is generated for extracting features representing the direction of the face. The generated normalized image has low resolution because the amount of shift in the image is relatively large with regard to the direction of the face.

In step S3900, the region setting unit 250 sets a feature extraction region necessary for recognizing a person's line of sight. For example, the region setting unit 250 sets a region of the entire face with respect to the normalized image 2000 using the central positions of the right and left eyes, face and mouth detected in step S3300, or using the feature points detected in step S3700.

In step S4000, the feature extraction unit 260 extracts LBP features from the normalized image 2000 including the region of the entire face generated in step S3900, as in First Embodiment. Alternatively, features (HOG) for calculating the luminance gradient direction and intensity may be extracted as described in Dalal and Triggs, "Histograms of Oriented Gradients for Human Detection", Proceedings of the IEEE Conference on Computer Vision and Pattern Recognition, 2005.

In step S4100, the histogram bin setting unit 270 selects histogram bins corresponding to the normalized image 2000 including the region of the entire face generated in step S3900 in accordance with the detail of recognition selected by the recognition detail selection unit 200 based on histogram bin information stored in the parameter storage unit 310.

Figure 14:
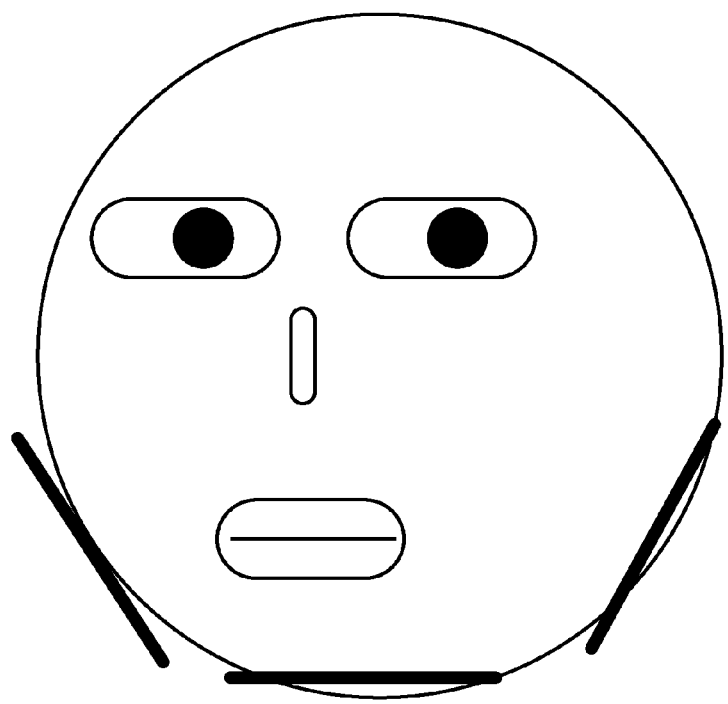
FIG. 14 shows edges of a facial outline and inclination directions thereof, which are important in recognizing the direction of the face.

In order to recognize the direction of a human face, it is important to capture the position of a facial outline shown in FIG. 14. The parameter storage unit 310 stores LBP features corresponding to the edges of the facial outline shown in FIG. 14. In the case of features (HOG) for calculating the luminance gradient direction and intensity as described in Dalal and Triggs, "Histograms of Oriented Gradients for Human Detection", Proceedings of the IEEE Conference on Computer Vision and Pattern Recognition, 2005, each histogram bin is set as a range, such as 30 degrees to 45 degrees, 80 degrees to 100 degrees, and 135 degrees to 150 degrees.

Furthermore, instead of generating 8-bit LBP using all of the values of eight adjacent pixels as shown in FIG. 6, the bits of LBP may be limited to 5 bits, 6 bits, etc. For example, in the case of a facial outline, it is possible to use five adjacent image values, which are the minimum necessary for capturing the facial outline, as shown in FIG. 15.

In step S4200, the histogram generation unit 280 generates a histogram based on the LBP features calculated in step S4000 and the histogram bins set in step S4100.

In step S4300, the histogram generation unit 280 determines whether or not histograms have been generated with respect to all regions. When the histogram generation unit 280 determines that histograms have been generated with respect to all regions (the YES branch of S4300), the processing moves to S4400. On the other hand, when the histogram generation unit 280 determines that histograms have not been generated with respect to all regions (the NO branch of S4300), the processing returns to S3600. Up to this point of processing, only the histogram representing the direction of a human face has been generated out of a plurality of regions. Therefore, returning to step S3600, a description is now given of generation of a histogram indicating the direction of the eyes.

In step S3600, the image normalization unit 230 generates a normalized image again from the image obtained in step S3200 using the central positions of the right and left eyes, face and mouth detected in step S3300, or using feature points detected when extracting the features representing the direction of the face. As the movement of the eyes (pupils) is minute in the image, the generated normalized image has high resolution so as to capture the movement of the eyes (pupils) with high sensitivity.

In step S3700, the feature point detection unit 240 detects more detailed feature points, such as inner and outer corners of the eyes, with the use of the high-resolution normalized image generated in step S3600 as shown in FIG. 12. By detecting feature points again from the high-resolution normalized image, a more accurate result of feature point detection can be obtained. Note that the feature point detection need not be performed with respect to the high-resolution normalized image so as to alleviate the processing load.

In step S3800, the image normalization unit 230 generates a normalized image again using the more accurate feature points detected in step S3700. In the case where the feature point detection is not performed in step S3700, the normalized image need not be generated again in step S3800.

In step S3900, the region setting unit 250 sets feature extraction regions with respect to the normalized image generated in step S3600 or S3800 as shown in FIG. 16. In the example of FIG. 16, eye regions 2001 and 2002 are set as the feature extraction regions.

In step S4000, the feature extraction unit 260 calculates LBP features with respect to images of the eye regions 2001 and 2002.

In step S4100, the histogram bin setting unit 270 sets bins necessary for generating a histogram. More specifically, the histogram bin setting unit 270 sets histogram bins corresponding to the eye regions set in step S3900. In order to recognize the direction of human eyes, it is important to capture the position of the pupils. Therefore, in the present embodiment, binary patterns that capture the outline of a pupil are set as bins for regions of human eyes as shown in FIG. 17.

In step S4200, the histogram generation unit 280 generates histograms based on the LBP features extracted in step S4000 and the histogram bins set in step S4100.

In step S4300, the histogram generation unit 280 determines whether or not histograms have been generated with respect to all regions. Up to this point, the histograms representing the direction of a human face and the direction of the eyes have been generated. Therefore, the histogram generation unit 280 determines that histograms have been generated with respect to all regions (the YES branch of S4300), and the processing moves to step S4400.

In step S4400, the histogram concatenation unit 290 generates a feature vector by concatenating the histograms representing the direction of a human face and the direction of the eyes, which were generated in step S4200. Note that dimensions may be reduced through, for example, principal component analysis before moving to step S4500.

In step S4500, the line of sight recognition unit 300 recognizes the line of sight using a discriminator similar to the one used in First Embodiment. In the present embodiment, a binary determination process for determining whether or not a person's line of sight is directed toward a camera is executed. Therefore, the result of binary determination indicating whether or not the person's line of sight is directed toward the camera serves as the result of recognition of the line of sight.

In step S4600, the face detection unit 220 determines whether or not the processing has been executed on all of the faces detected in step S3300. When the face detection unit 220 determines that the processing has been executed on all of the faces (the YES branch of S4600), the processing moves to S4700. On the other hand, when the face detection unit 220 determines that the processing has not been executed on all of the faces (the NO branch of S4600), the processing returns to S3500 where the face detection unit 220 selects a face on which the processing has not been executed yet. Then, the selected face is similarly subjected to subsequent processes.

In step S4700, the image recognition apparatus 20 determines whether or not to perform imaging based on the result of recognition of the line of sight in step S4500. When the image recognition apparatus 20 determines that the imaging is to be performed (the YES branch of S4700), the processing moves to S4800. On the other hand, when the image recognition apparatus 20 determines that the imaging is not to be performed (the NO branch of S4700), the processing returns to step S3200 where the next image is obtained.

In step S4800, an imaging unit, which is not shown in the figures, performs the imaging, stores the captured image in a predetermined non-volatile memory and the like, and ends the processing.

This concludes the description of the method for reducing the number of bins of histograms generated from the luminance gradient direction and intensity in accordance with recognition targets and regions in the face for which histograms are generated. This method allows reducing dimensions of a feature vector generated using the histograms, and therefore alleviating the processing load at a stage subsequent to the histogram generation process.

Figure 18:
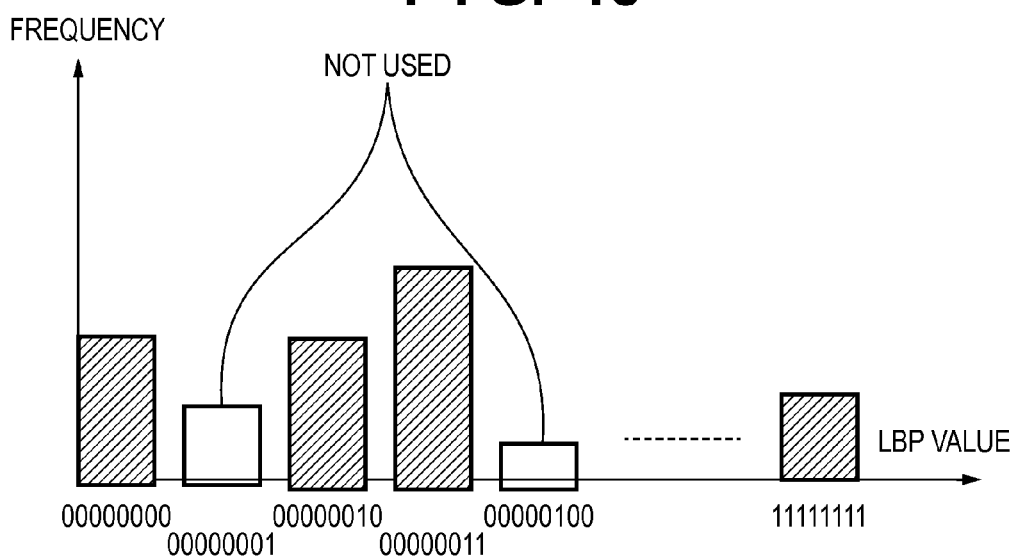
FIG. 18 shows histograms that are used in generating a feature vector and histograms that are not used in generating a feature vector.

Note that in First Embodiment and Second Embodiment, limited bins are set for use in generating histograms. Alternatively, dimensions of the feature vector may be reduced by selecting, from among bins that have been prepared in correspondence with all patterns of LBP values, bins corresponding to LBP values that are used in generating the feature vector, as shown in FIG. 18.

(Third Embodiment)

Third Embodiment differs from First Embodiment in estimating attributes representing the age and sex. An overall configuration of an image recognition apparatus according to the present embodiment is similar to First Embodiment. The following describes a modification example of the histogram bin setting process explained in First Embodiment.

Figure 19:
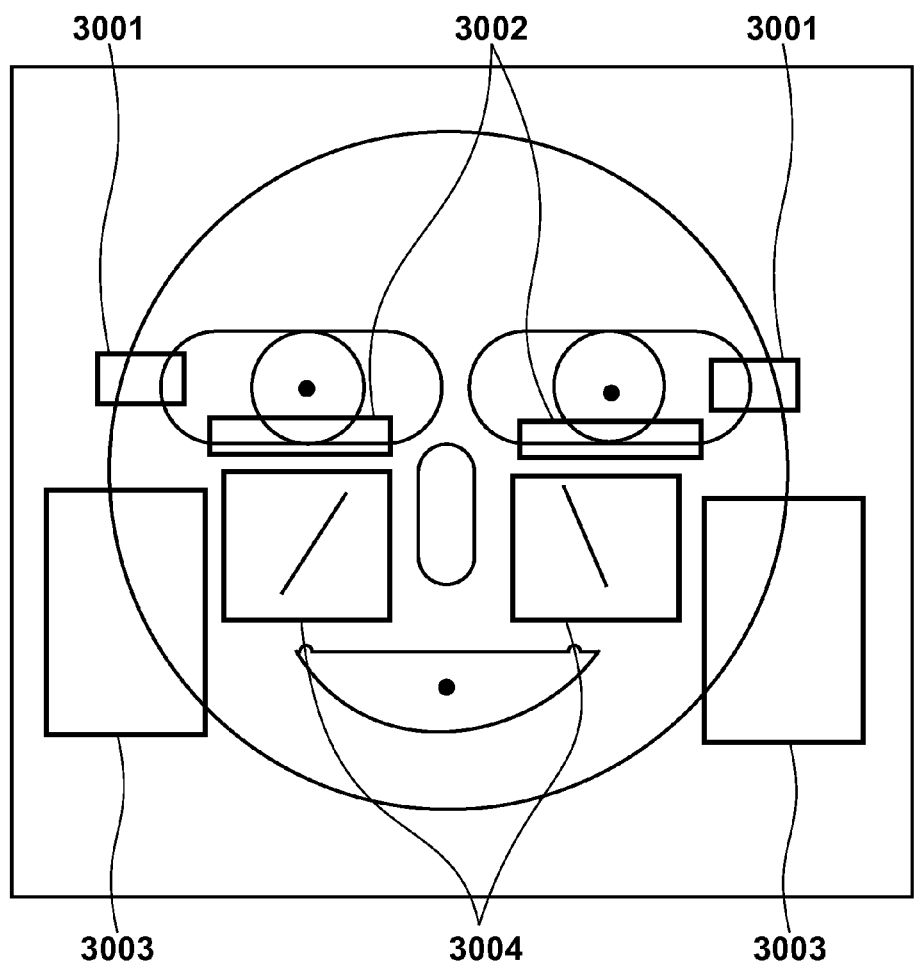
FIG. 19 shows feature extraction regions necessary for estimating the age and sex.

FIG. 19 shows regions that are set by the region setting unit 130 when estimating the age and sex. In general, as people get older, wrinkles and the like appear on some local regions of their faces. Also, men and women have different facial outlines in particular. Therefore, in order to estimate the age and sex, it is extremely important to capture regions 3001 of wrinkles around outer corners of the eyes, regions 3002 of wrinkles around lower eyelids, regions 3003 of a facial outline, and regions 3004 of wrinkles on the cheeks.

FIG. 20 shows LBP features that are used in correspondence with the regions of the outer corners of the eyes, the lower eyelids, the cheeks, and the facial outline. For the regions of the outer corners of the eyes and the lower eyelids, LBP features representing horizontal edges are mainly set. For the regions of the cheeks, LBP features representing diagonal edges are mainly set. For the regions of the facial outline, LBP features representing vertical edges are mainly set.

In the case where features are extracted from a large number of regions as shown in FIG. 19, such as when estimating the age and sex, the processing load can be alleviated to a great extent by limiting the histogram bins on a per-region basis. In the above-described manner, when a large number of regions are set due to the recognition targets being attributes representing the age and sex, the processing load can be alleviated by limiting the bins in accordance with each region.

(Fourth Embodiment)

First Embodiment through Third Embodiment have described the case where, out of a plurality of bins corresponding to a plurality of patterns forming feature patterns of local regions, bins that have been predetermined based on statistics are set as bins used in generating histograms. The present embodiment describes specific processing for, before obtaining an image and performing image recognition, determining bins in advance based on statistics with the use of a histogram determination unit.

Figure 21:
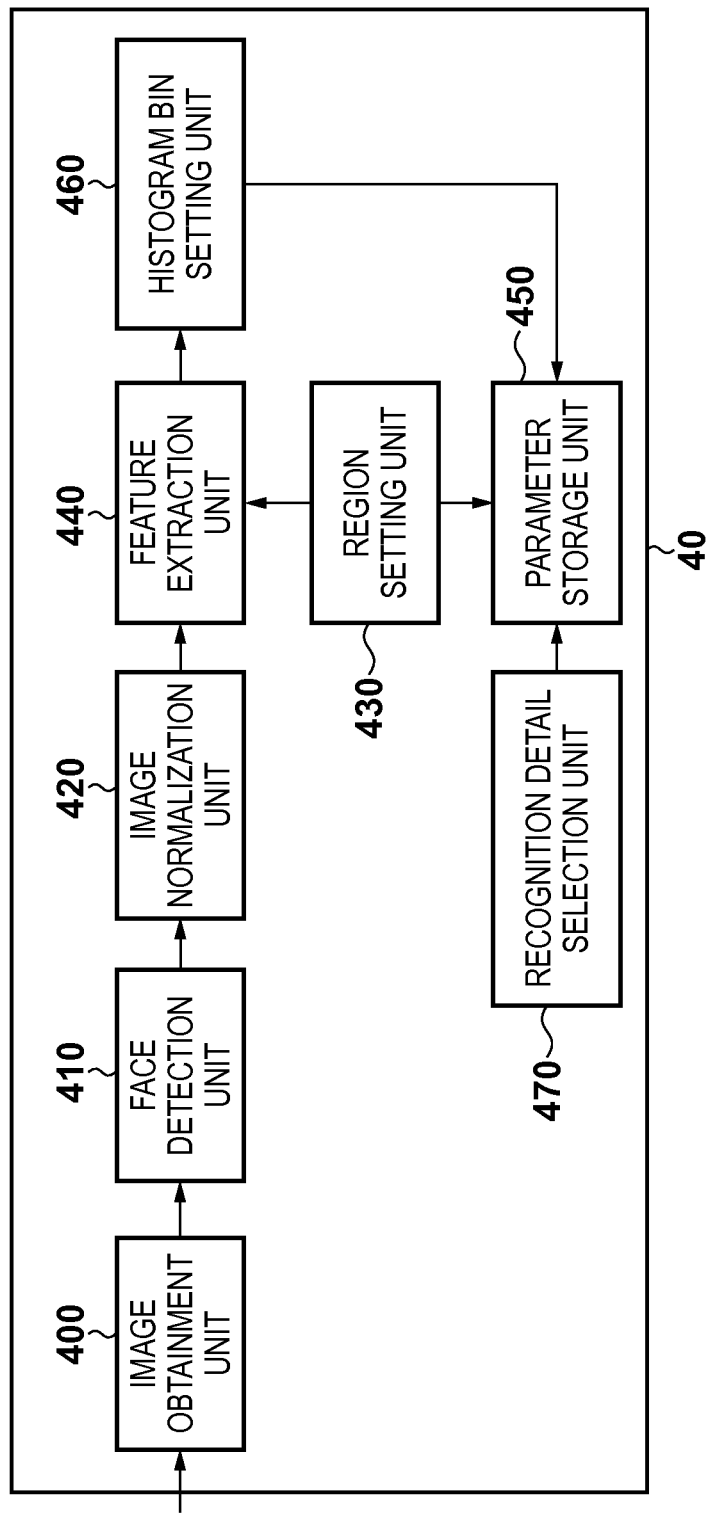
FIG. 21 shows an overall configuration of an image recognition apparatus including a histogram bin determination unit that determines bins of histograms used in image recognition processing based on statistics.

FIG. 21 shows an overall configuration of an image recognition apparatus 40 that determines histogram bins based on statistics. As shown in FIG. 21, the image recognition apparatus 40 includes an image obtainment unit 400, a face detection unit 410, an image normalization unit 420, a region setting unit 430, a feature extraction unit 440, a parameter storage unit 450, a histogram bin determination unit 460, and a recognition detail selection unit 470. Note that the image obtainment unit 400, the face detection unit 410, the image normalization unit 420, the region setting unit 430, the feature extraction unit 440, and the parameter storage unit 450 are similar to corresponding processing units according to First Embodiment, and the recognition detail selection unit 470 is similar to the recognition detail selection unit 200 according to Second Embodiment. Therefore, a description of these units is omitted. Before performing image recognition, the histogram bin determination unit 460 determines bins in advance based on statistics. For example, for each of the types of local regions in an image obtained in advance, the histogram bin determination unit 460 determines, as predetermined histogram bins, histogram bins corresponding to patterns with a higher frequency of appearance than a threshold out of a plurality of patterns forming feature patterns extracted from the corresponding local region. Furthermore, with regard to a plurality of patterns that form feature patterns and have a higher frequency of appearance than a threshold, the histogram bin determination unit 460 may also exclude bits having the same value out of bit strings representing these patterns.

Figure 22:
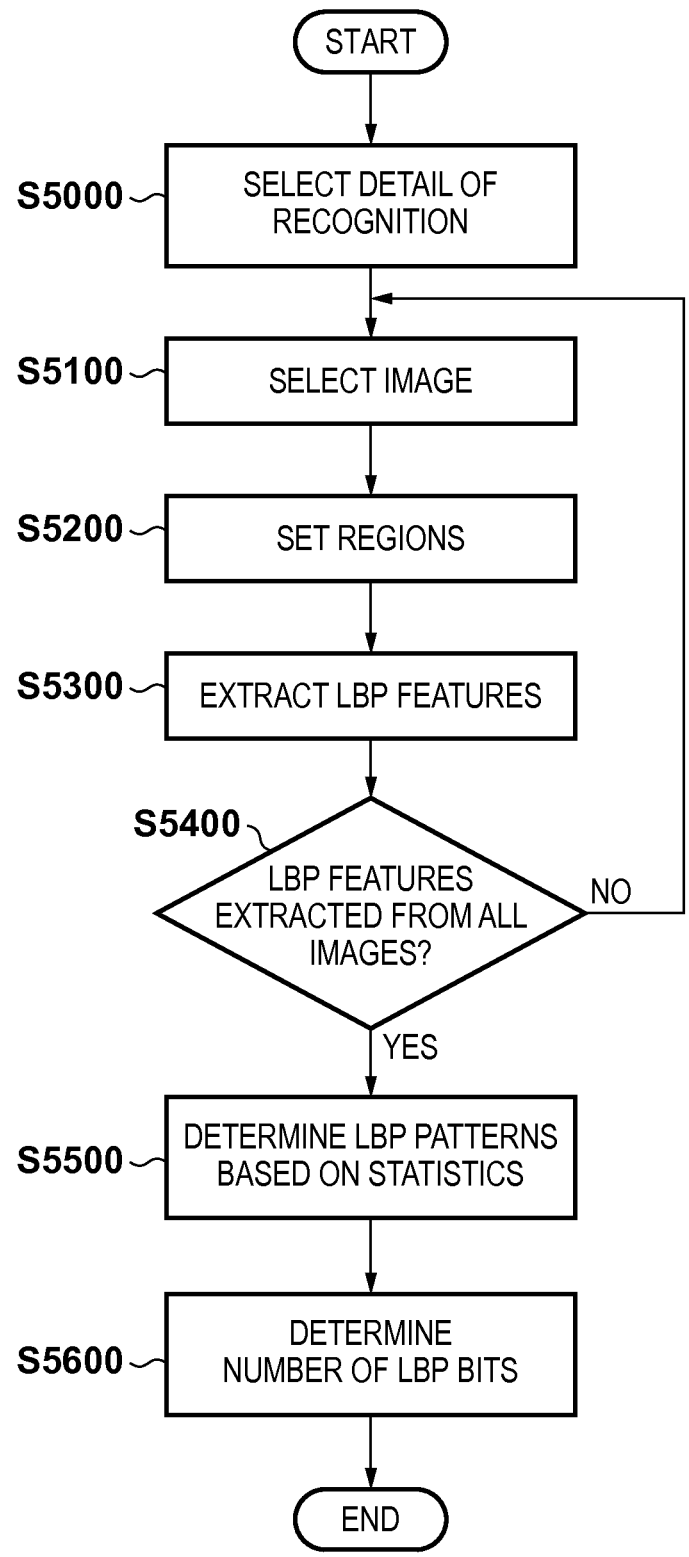
FIG. 22 is a flowchart showing a procedure of processing for determining LBP based on statistics and the number of bits of LBP.

A description is now given of a procedure of processing executed by the histogram bin determination unit 460 with reference to a flowchart of FIG. 22.

In step S5000, the recognition detail selection unit 470 accepts a selection of the detail of recognition. For example, the recognition detail selection unit 470 accepts an attribute such as a facial expression (e.g. a smile) described in First Embodiment, a line of sight described in Second Embodiment, and the sex and age described in Third Embodiment.

In step S5100, the image obtainment unit 400 selects one piece of image data from among a group of images used in researching statistics.

In step S5200, the region setting unit 430 sets regions in accordance with the result of selection of the detail of recognition in step S5000. For example, in the case of a facial expression described in First Embodiment, such as a smile, it is necessary to capture changes in regions of the eyes, cheeks and mouth. Therefore, when a smile is selected in step S5000, regions of the eyes, cheeks and mouth are set.

In step S5300, the feature extraction unit 440 extracts LBP features from the regions set in step S5200.

In step S5400, the feature extraction unit 440 determines whether or not LBP features have been extracted from all of the predetermined images. When the feature extraction unit 440 determines that LBP features have been extracted from all of the images (the YES branch of S5400), the processing moves to S5500. On the other hand, when the feature extraction unit 440 determines that LBP features have not been extracted from all of the images (the NO branch of S5400), the processing returns to step S5100 where the image obtainment unit 100 selects an image from which LBP features have not been extracted yet.

In step S5500, the histogram bin determination unit 460 researches statistics of LBP features of all of the images that have been prepared in advance. In this research of statistics, the histogram bin determination unit 460 generates a histogram with respect to each region selected in step S5200, and selects LBP features with a higher frequency of appearance than a threshold.

For example, FIG. 23 shows a histogram of LBP features of certain regions extracted from images that have been prepared for the research of statistics. Here, 80% of the total number of images used for the research of statistics is set as a threshold. Then, a threshold process is executed whereby bins corresponding to LBP features that have exceeded the threshold are used as LBP features set as histogram bins, and other LBP features are not used. Although 80% of the total number of images is set as a threshold of LBP set as histogram bins in the present embodiment, the threshold is not limited to this percentage.

In step S5600, the histogram bin determination unit 460 determines the number of LBP bits using the LBP features determined in step S5500. For example, in the case where the three patterns 00011111, 00011100 and 00011000 shown in FIG. 24 are the LBP features determined in step S5500, namely the LBP features with a higher frequency of appearance than the threshold, the first three bits have the same value 000 (constant), and therefore it suffices to perform calculation only on the remaining five bits. That is to say, when certain bits of the LBP features determined in step 55500, namely the LBP features with a high frequency of appearance, have the same value (constant), these certain bits are excluded. Therefore, for the regions where the three patterns 00011111, 00011100 and 00011000 shown in FIG. 24 are selected, calculation is performed only on the five bits remaining after excluding the first three bits. The number of bits of LBP features thus varies depending on regions in the face.

In the above-described manner, final LBP to be set as histogram bins is determined through two processes, namely a threshold process based on histograms and a process for reducing the number of bits. Note that the process of step S5600 for reducing the number of bits is not necessarily indispensable.

By determining LBP features to be set as histogram bins through the above-described processing, the speed of the subsequent image recognition processing can be improved.

The present invention can improve the accuracy and speed of image recognition processing.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264123 filed on Dec. 1, 2011, which is hereby incorporated by reference herein in its entirety.

What is claimed is:

1. An image recognition apparatus comprising:
    an image obtainment unit configured to obtain an image;
    a region setting unit configured to set at least one local region in the image;
    a feature extraction unit configured to extract feature patterns from the local region;
    a determination unit configured to determine, in correspondence with a type of a local region in an image obtained in advance, bins corresponding to patterns with a higher frequency of appearance than a threshold, out of a plurality of patterns forming feature patterns extracted from the local region;
    a setting unit configured to set, out of a plurality of bins corresponding to the plurality of patterns, bins that have been determined in accordance with the type of the local region as histogram bins used in generating a histogram;
    a generation unit configured to generate a histogram corresponding to the extracted feature patterns using the set histogram bins; and
    a recognition unit configured to perform image recognition using the generated histogram.

2. The image recognition apparatus according to claim 1, further comprising
    an acceptance unit configured to accept a selection of a recognition target on which the image recognition is performed by the recognition unit, wherein
    the determination unit determines bins in accordance with the type of the local region and the recognition target accepted by the acceptance unit.

3. The image recognition apparatus according to claim 2, wherein
    the recognition target is an attribute representing a facial expression, a line of sight, an age, a sex, or a race of a person in the image.

4. The image recognition apparatus according to claim 1, further comprising
    a storage unit configured to store information on predetermined bins in correspondence with the type of the local region which is referred to by the region setting unit.

5. The image recognition apparatus according to claim 1, wherein
    the feature patterns represent at least one of local binary patterns, a luminance gradient direction, and color.

6. The image recognition apparatus according to Claim 1, wherein
    with respect to a plurality of patterns that form the feature patterns and that have a higher frequency of appearance than a threshold, the determination unit excludes bits having the same value out of bit strings representing the plurality of patterns.

7. A control method for an image recognition apparatus, comprising the steps of:
    obtaining an image;
    setting at least one local region in the image;
    extracting feature patterns from the local region;
    determining, in correspondence with a type of a local region in an image obtained in advance, bins corresponding to patterns with a higher frequency of appearance than a threshold, out of a plurality of patterns forming feature patterns extracted from the local region;
    setting, out of a plurality of bins corresponding to the plurality of pattern, bins that have been determined in accordance with the type of the local region as histogram bins used in generating a histogram;
    generating a histogram corresponding to the extracted feature patterns using the set histogram bins; and
    performing image recognition using the generated histogram.

8. A non-transitory computer-readable storage medium storing a computer program for causing a computer to execute the steps of the control method for the image recognition apparatus according to claim 7.

* * * * *